(12) United States Patent
Kelly et al.

(10) Patent No.: US 6,493,353 B2
(45) Date of Patent: *Dec. 10, 2002

(54) COMMUNICATIONS SIGNALING GATEWAY AND SYSTEM FOR AN ADVANCED SERVICE NODE

(75) Inventors: Patrick J Kelly, Conroe, TX (US); David Phelps, Colorado Springs; Lou Severini, Woodland Park, both of CO (US)

(73) Assignee: MCI Communications Corporation, Washington, DC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/074,072

(22) Filed: May 7, 1998

(65) Prior Publication Data

US 2002/0126678 A1 Sep. 12, 2002

(51) Int. Cl.[7] .................................................. H04J 3/16
(52) U.S. Cl. ....................................... 370/467; 370/401
(58) Field of Search ................................ 379/219–232; 709/223, 226; 370/230, 352, 353, 355, 356, 359, 400, 401, 410, 414, 466, 467; 395.1

(56) References Cited

U.S. PATENT DOCUMENTS

| | | | |
|---|---|---|---|
| 4,797,910 A | 1/1989 | Daudelin | 379/67 |
| 4,845,739 A | 7/1989 | Katz | 379/92 |
| 4,930,150 A | 5/1990 | Katz | 379/93 |
| 5,048,075 A | 9/1991 | Katz | 379/92 |
| 5,128,984 A | 7/1992 | Katz | 379/92 |
| 5,133,004 A | 7/1992 | Heileman, Jr. et al. | |
| 5,165,095 A | 11/1992 | Borcherding | |
| 5,185,781 A | 2/1993 | Dowden et al. | |
| 5,251,252 A | 10/1993 | Katz | 379/92 |
| 5,255,309 A | 10/1993 | Katz | 379/88 |
| 5,259,023 A | 11/1993 | Katz | 379/88 |
| 5,325,421 A | 6/1994 | Hou et al. | |

(List continued on next page.)

OTHER PUBLICATIONS

Stallings, William, 1995, ISDN and Broadband ISDN with Frame Relay and ATM, 3rd edition, pp: 257–277.*

Emerson, E. Thomas, "Voice Response Systems—Technology to the Rescue for Business Users", Speech Technology, pp. 99–103 (Jan./Feb. 1983).

Hester, et al., "The AT&T Multi–Mode Voice Systems—Full Spectrum Solutions for Speech Processing Applications", Proceedings of the 1985 AVIOS Conference, pp. 1,3,5,7 and 9 (Sep. 1985).

Moosemiller, John P., "AT&T's Conversant I Voice System", Speech Technology, pp. 88, 90 and 92 (Mar./Apr. 1986).

Perdue, Robert J. and Eugene L. Rissanon, "Conversant 1 Voice System Architecture and Applications," AT&T Technical Journal, pp. 34–47 (Sep./Oct. 1986).

*Primary Examiner*—David Vincent

(57) ABSTRACT

A signaling gateway allows a next generation of service nodes to be deployed in any communications switch network without requiring any further development or customization. The signaling gateway encapsulates multiple signaling systems into a single interface embodied in a telecommunication service provider's proprietary signaling protocol. The signaling gateway also performs call and resource management. A next generation of service nodes may then be designed to process a reduced set number of messages that have a common format and that perform fundamental functions common to all signaling systems. Any differences in implementation of any signaling system, as well as detailed functions performed for call setup and resource management, are transparent to the service node.

12 Claims, 5 Drawing Sheets

U.S. PATENT DOCUMENTS

| | | | |
|---|---|---|---|
| 5,349,633 A | 9/1994 | Katz | 379/88 |
| 5,351,285 A | 9/1994 | Katz | 379/94 |
| 5,353,339 A | 10/1994 | Scobee | |
| 5,519,772 A | 5/1996 | Akman et al. | |
| 5,533,115 A | 7/1996 | Hollenbach et al. | |
| 5,553,119 A | 9/1996 | McAllister et al. | |
| 5,561,707 A | 10/1996 | Katz | 379/88 |
| 5,572,583 A | 11/1996 | Wheeler, Jr. et al. | |
| 5,581,600 A | 12/1996 | Watts et al. | |
| 5,583,920 A | 12/1996 | Wheeler, Jr. et al. | |
| 6,038,293 A | 9/1997 | McNerney et al. | |
| 5,689,553 A | 11/1997 | Ahuja et al. | 379/202 |
| 5,692,033 A | 11/1997 | Farris | |
| 5,706,286 A | 1/1998 | Reiman at al. | 370/401 |
| 5,742,905 A | 4/1998 | Pepe et al. | |
| 5,793,771 A | 8/1998 | Darland et al. | 370/467 |
| 5,802,146 A | 9/1998 | Dulman | |
| 5,805,675 A * | 9/1998 | Chanda | 379/93.14 |
| 5,818,921 A * | 10/1998 | Meiden et al. | 379/225 |
| 5,825,752 A | 10/1998 | Fujimori et al. | 370/260 |
| 5,854,834 A | 12/1998 | Gottlieb et al. | |
| 5,867,494 A | 2/1999 | Krishnaswamy et al. | |
| 5,881,131 A | 3/1999 | Farris et al. | |
| 5,881,135 A | 3/1999 | Watts et al. | |
| 5,883,939 A | 3/1999 | Friedman et al. | |
| 5,915,008 A | 6/1999 | Dulman | |
| 5,917,900 A | 6/1999 | Allison et al. | |
| 5,920,562 A | 7/1999 | Christie et al. | |
| 5,923,659 A * | 7/1999 | Curry et al. | 370/401 |
| 5,923,859 A | 7/1999 | Melo et al. | |
| 5,926,524 A | 7/1999 | Taylor | |
| 5,930,348 A | 7/1999 | Regnier et al. | 379/221 |
| 5,931,914 A | 8/1999 | Chiu | 709/230 |
| 5,937,029 A | 8/1999 | Yosef | |
| 5,953,389 A | 9/1999 | Pruett et al. | |
| 5,956,396 A | 9/1999 | Ash et al. | |
| 5,974,252 A | 10/1999 | Lin et al. | |
| 5,987,118 A | 11/1999 | Dickerman et al. | |
| 5,987,331 A | 11/1999 | Grube et al. | 455/509 |
| 5,995,610 A | 11/1999 | Smidt et al. | |
| 5,999,525 A * | 12/1999 | Krishnaswamy et al. | 370/352 |
| 6,003,031 A | 12/1999 | Hartikainen et al. | |
| 6,014,428 A | 1/2000 | Wolf | |
| 6,018,567 A | 1/2000 | Dulman | |
| 6,041,325 A | 3/2000 | Shah et al. | |
| 6,044,142 A | 3/2000 | Hammarstrom et al. | |
| 6,044,144 A | 3/2000 | Becker et al. | |
| 6,044,259 A | 3/2000 | Hentila et al. | |
| 6,081,591 A | 6/2000 | Skoog | |
| 6,104,803 A | 8/2000 | Weser et al. | 379/230 |
| 6,108,410 A | 8/2000 | Reding et al. | |
| 6,111,893 A * | 8/2000 | Volftsun et al. | 370/466 |
| 6,122,345 A | 9/2000 | Johnson | |
| 6,134,311 A | 10/2000 | Ekstrom | |
| 6,137,862 A | 10/2000 | Atkinson et al. | |
| 6,144,727 A * | 10/2000 | Mashinsky | 379/112 |
| 6,198,813 B1 | 3/2001 | Pullen et al. | |
| 6,233,316 B1 | 5/2001 | Schier et al. | |

\* cited by examiner

COMMUNICATIONS SIGNALING GATEWAY AND SYSTEM FOR AN ADVANCED SERVICE NODE

CROSS-REFERENCE TO RELATED APPLICATIONS

This application is related to commonly-owned, co-pending applications filed concurrently herewith, entitled:

"Advanced Interactive Voice Response Service Node" having application Ser. No. 09/073,880;

"Telecommunications Architecture for Call Center Services Using Advanced Interactive Voice Response Service Nodes" having application Ser. No. 09/074,096;

"Interactive Voice Response Service Node with Advanced Resource Management" having application Ser. No. 09/074,142;

"Service Provisioning System for Interactive Voice Response Services" having application Ser. No. 09/074,050;

"Call and Circuit State Machine for a Transaction Control Layer of a Communications Signaling Gateway" having application Ser. No. 09/073,885; and "System for Executing Advanced Interactive Voice Response Services Using Service-Independent Building Blocks" having application Ser. No. 09/073,887.

BACKGROUND OF THE INVENTION

1. Field of the Invention

The present invention relates generally to computer telephony, and more particularly to providing a communications signaling gateway for advanced service node platforms to handle calls on a telephone network.

2. Related Art

Service node platforms that provide enhanced call services are common in the telecommunications industry. The modern trend is to design and implement modular service nodes that can be placed anywhere throughout a telecommunications network. A common example of a service node is an Interactive Voice Response (IVR) service node. It is common for a business, that is a customer of a telecommunications service provider, to use IVR services in conjunction with call center services. The IVR service nodes are commonly used for customer call center routing. They perform processing of customer applications, based on one or more criteria selected by the customer, such as the dialed number of a call, Dialed Number Identification Service (DNIS), Automatic Number Identification (ANI), time of day, caller-entered digits, geographic point of call origin, etc. The IVR service nodes may also perform other IVR services such as automated servicing of callers for customers, caller surveys, telemarketing, and call parking until a call center has an available resource (e.g., a customer service agent).

Conventional IVR service nodes require specialized architectures as customers demand more customized IVR applications. Consequently, different types of IVR service nodes are implemented throughout a telecommunications network to handle different customer's IVR applications. This results in an inefficient network because a call needing a certain application must be routed to a certain IVR service node irrespective of that node's current load. Therefore, a next generation of service nodes will be designed to provide customized services for many different customers, all on a common platform.

The next generation of IVR service nodes will be complex computing platforms including extensive software designed to perform a great number of functions. Any modification to the platform as a result of interface changes will require significant time, money and effort. Furthermore, a platform will be offered for sale to different telecommunications carriers. These carriers most likely will utilize different network signaling systems. For example, most carriers in North America use the American National Standards Institute's (ANSI) Signaling System 7 (SS7), whereas many European carries use the International Telecommunications Union's (ITU) C7. Different signaling systems may even be employed in the same network. For example, a carrier may use ANSI SS7 signaling for access and inter-exchange switching, while using ISDN Switch Computer Application Interface (SCAI) for automated call distributors (ACD). The SCAI is also an ANSI standard for Computer Telephony Integration (CTI) and is well known in the relevant art. To add to the problem, signaling systems undergo periodic updates and new version releases by standards bodies (e.g., ANSI, ITU, etc.). These all require interface modifications to any next generation service node platforms located on a telecommunications network. Therefore, what is needed is a communications signaling gateway to encapsulate multiple communications network signaling systems into a single signaling interface for the advanced IVR service node platforms.

SUMMARY OF THE INVENTION

The present invention is directed to a system and method for encapsulating multiple telecommunications network signaling systems into a single signaling interface for use by a next generation service node (NGSN) in a telecommunications network. The method includes interfacing a communications signaling gateway to the telecommunications network and interfacing the NGSN to a signaling gateway. A telecommunication service provider would then define a proprietary signaling protocol (PSP) to communicate with the NGSN platforms deployed in the telecommunications network. The communications signaling gateway receives the network's signaling messages and translates them into PSP messages. The communications signaling gateway then sends the PSP message to the NGSN. This process works in both directions to encapsulate the NGSN from the network.

An advantage of the present invention is that NGSN platforms may be designed to process a reduced set number of messages that have a common format and that perform fundamental functions common to all signaling systems.

Another advantage of the present invention is that the signaling gateway also performs call and resource management and provides a redundant architecture for performing failover.

Yet another advantage of the present invention is that any signaling system implementation variations, as well as detailed functions performed for call setup and resource management, are transparent to the service node. Further features and advantages of the present invention as well as the structure and operation of various embodiments of the invention are described in detail below with reference to the accompanying drawings.

BRIEF DESCRIPTION OF THE FIGURES

The present invention will be described with reference to the accompanying drawings, wherein.

DETAILED DESCRIPTION OF THE PREFERRED EMBODIMENTS

Overview

The present invention is directed to a communications signaling gateway for a next generation service node (NGSN). A NGSN provides a modular platform for advanced interactive voice response (IVR) services to customers of an IVR service provider. In a preferred embodiment of the present invention, a customer may have multiple call centers distributed geographically, all of which are accessed by a single toll-free number. A call to the toll free number is routed by a switch network to the NGSN. The NGSN then performs a customer IVR application, which may prompt the caller for certain information and collect other information (e.g., dialed number, caller ANI, etc.) from the network. Based on the information and possibly other information (e.g., time of day), the NGSN determines which call center to route the call. The NGSN platform may be implemented in any telecommunications network using any of a variety of signaling systems. However, the NGSN platform is a complex computing platform with great costs associated with making any modifications to the platform. Therefore, the objective of the present invention is to provide a communications signaling gateway that encapsulates multiple network signaling systems into a single signaling interface for NGSN platforms to communicate with the network in which it is deployed, regardless of the switch network's signaling system.

The present invention is described in terms of the above example environment. This is for convenience only and is not intended to limit the application of the present invention. In fact, after reading the following description, it will be apparent to one skilled in the relevant art how to implement the following invention in alternate embodiments.

Signaling Gateway Environment

Figure 1:
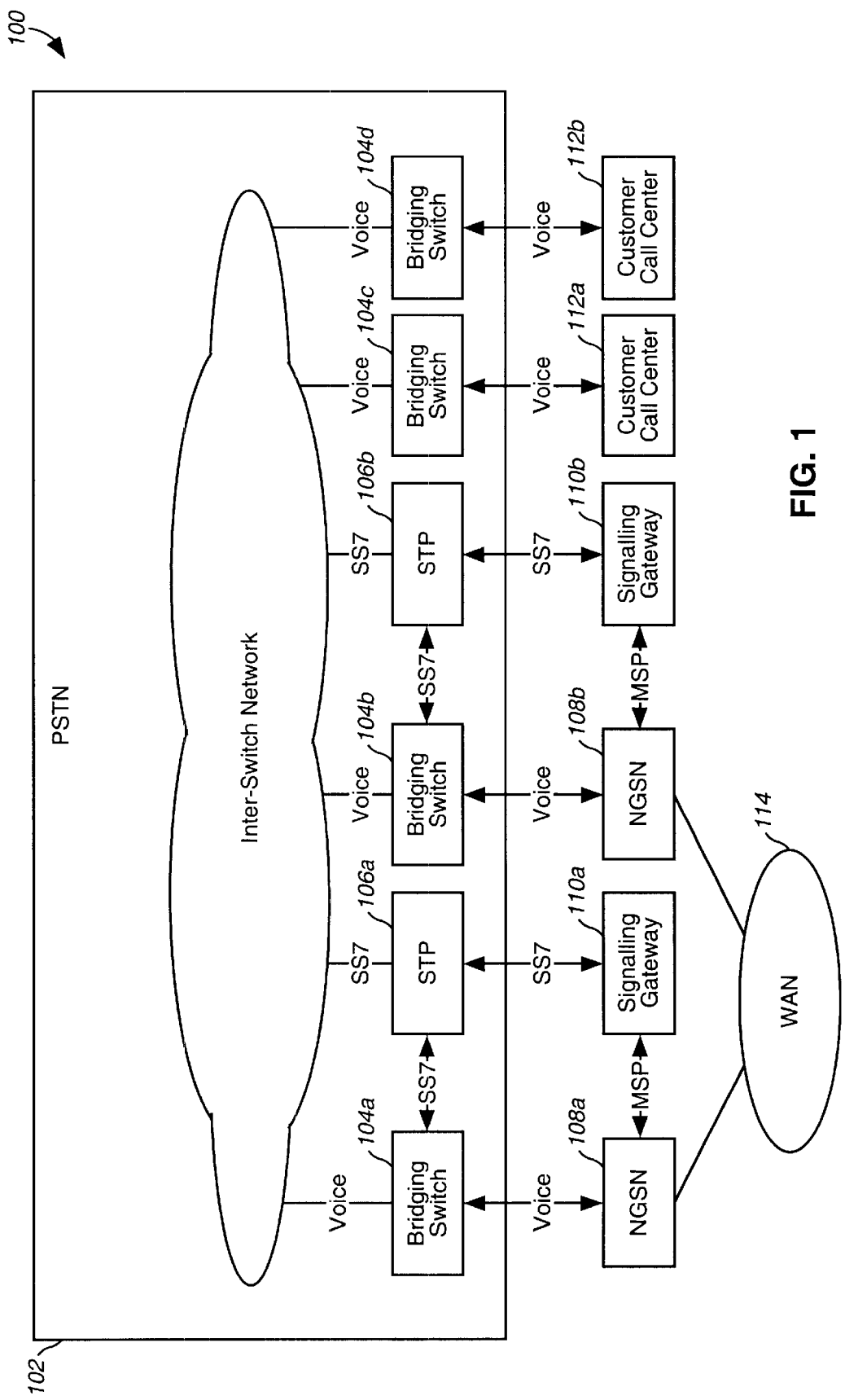
FIG. 1 is a block diagram illustrating the architecture of a telecommunications network in which the present invention would operate.

FIG. 1 is a block diagram illustrating the architecture of a telecommunications network 100. Network 100 uses a next generation service node (NGSN) 108 (shown as 108a, 108b) to perform IVR services. The NGSN 108 is a computing and telephony platform which includes a management workstation, a pair of redundant application servers, a shared disk array, and a plurality of intelligent peripherals. All of these components are connected via a local area network (LAN) within the NGSN 108. An NGSN 108 architecture is described in detail in a commonly-owned, co-pending application filed concurrently herewith, entitled "Advanced Interactive Voice Response Service Node" having application number 09/073,880, which is incorporated herein by reference in its entirety. Additional special features of NGSN 108 are described in detail in a commonly-owned, co-pending application filed concurrently herewith, entitled "System for Executing Advanced Interactive Voice Responses Services using Service-Independent Building Blocks" having application number 09/073,887 and "Interactive Voice Response Services Node with Advanced Resource Management" having application number 09/074,142, both of which are incorporated herein by reference in their entirety.

The NGSN 108 is connected to a bridging switch 104 (shown as 104a–104d), which provides access to a Public Switched Telephone Network (PSTN) (referred to as "switch network") 102. In a preferred embodiment, bridging switch 104 is a Northern Telecom DMS-250 digital matrix switch that supports Release Link Trunk (RLT) voice connections to the NGSN 108 and is well known in the relevant art.

Modern switch networks (e.g., PSTN 102) commonly use an out-of-band signaling system. In North America, ANSI SS7 is typical whereas in Europe, ITU C7 is used. In network 100, a signaling gateway 110 communicates with the bridging switch 104, via a signal transfer point (STP) 106, using SS7. The STP 106 performs switching and routing of SS7 signaling messages among various switches in the switch network 102, as well as among other components. The NGSN 108 is connected to the STP 106 via the signaling gateway 110. Use of the signaling gateway 110 insulates the NGSN 108 from whatever type of signaling system is used in the switch network 102. In other words, signaling gateway 110 translates from whatever signaling system switch network 102 is using, to whatever telecommunications service provider's proprietary signaling protocol (PSP) NGSN 108 uses and recognizes. Signaling gateway 110 also performs resource management and call state management for NGSN 108.

FIG. 1 further illustrates how the architecture of network 100 may be scaled. A plurality of NGSN 108 nodes (shown as NGSN 108a and 108b) may be connected to the switch network 102 and deployed at various locations. Each NGSN 108 node is connected to the switch network 102 via one of the plurality of bridging switches 104 (shown as bridging switch 104a–104d) using voice trunks. Each bridging switch 104 is part of the switch network 102. Furthermore, each NGSN 108 is connected to a signaling gateway 110 (shown as signaling gateway 110a and 110b) via data links. In turn, each signaling gateway 110 is connected to one of the plurality of STPs 106 (shown as STP 106a and 160b), which is also part of the switch network 102. Each NGSN 108 is linked to a wide area network (WAN) 114. The WAN 114 provides each NGSN 108 access to the other components of the NGSN network as described in further detail in a commonly-owned, co-pending application filed concurrently herewith, entitled, "Telecommunications Network Architecture for Call Center Services using advanced Interactive Voice Response Service Nodes" having application number 09/074,096 which is incorporated herein by reference in its entirety.

FIG. 1 also reflects the fact that multiple call centers 112 (shown as call center 112a and 112b) may be added to the network 100, each served by the plurality of NGSN 108 nodes. Any call to a customer may be first routed to any NGSN 108, and then routed to any or to a particular call center 112. There may be one or multiple NGSN 108 nodes connected to one of the plurality of bridging switches 104, as well as one or multiple call centers 112 connected to one of the plurality of bridging switches 104.

Call Processing

When a call is routed to the NGSN by the PSTN 102, the call is sent to the bridging switch 104 that is connected to the NGSN 108. The call is then carried via voice trunks to the NGSN 108. The bridging switch 104 sends SS7 signaling for the call to NGSN 108 via the STP 106 and the signaling gateway 110. Signaling for the call is carried over SS7 data links to the STP 106. The STP 106 routes SS7 messages for the call to the signaling gateway 110.

The signaling gateway 110 translates the SS7 signaling to a telecommunication service provider's proprietary signaling protocol (PSP). Use of the signaling gateway 110 and the PSP insulates the NGSN from SS7 (or whatever signaling system in use by the switch network 102 ). Service nodes such as the NGSN 108 utilize the functionality contained within SS7 integrated services digital network user part (ISUP) messages for transaction control and resource management. The signaling gateway 110 receives SS7 ISUP messages from the STP 106, which were originally generated by the bridging switch 104. The signaling gateway 100 uses ISUP messages in an internal ISUP state machine to perform transaction control and resource management functions. After determining the state of the call and the function needed, the signaling gateway 110 then generates and sends a PSP message to communicate the current call state and function needed to the NGSN 108.

The signaling gateway 110 also receives PSP messages from the NGSN 108. It processes these in the same way, to trigger state changes in its internal state machine, determine current call state, and determine functions needed. It then generates an SS7 ISUP message to communicate this information, and then sends an ISUP message to the bridging switch 104 via the STP 106.

The signaling gateway 110 also uses its internal state machine process to manage resources of both the NGSN 108 and the bridging switch 104. It uses ISUP messages from the bridging switch 104 and PSP messages from the NGSN 108 to determine which ports on each NGSN 108 are available and unavailable. It also determines, for unavailable ports, the reason they are unavailable, such as if they are processing a call or are blocked for maintenance.

Proprietary Signaling Protocol (PSP)

In FIG. 1, a preferred embodiment of the signaling gateway 110 is shown providing an ANSI SS7 interface to the NGSN 108 IVR platform. Other embodiments are possible with similar architectures. There are other signaling systems, such as ITU C7, which is common in Europe, and ISDN Switch Computer Application Interface (SCAI), which is commonly used for signaling between automatic call distributors (ACDs) and service nodes.

There are also different variations of ANSI SS7, particularly different versions of ISUP messaging. For example, some versions of ISUP include a Release Link Trunk (RLT) feature, which allows NGSN 108 (and other IVR platforms in general) to extend inbound calls to the network by originating an outbound call and instructing the bridging switch 104 to connect the inbound call with the outbound call, thereby releasing all ports on the NGSN 108 for the remaining duration of the call. Most PSTN 102 carriers implement their own variation of the SS7 ISUP messaging format. In addition to including RLT capabilities, some telecommunication providers include additional fields in an ISUP message to be used in a variety of ways. The signaling gateway 110 encapsulates these different variations from the NGSN 108, so that the same NGSN 108 may be deployed in a network using a different version of SS7 without requiring further development or customization.

The key advantage to the signaling gateway 110 is the generation and use of a PSP as a single signaling interface for NGSN 108. A PSP encapsulates the high-level functions of service node signaling messages, such as SS7 ISUP messages, into a set of common messages. Many of the detailed call setup functions performed with SS7 ISUP are handled by the signaling gateway 110. Call and resource state management are also performed by the signaling gateway 110. The PSP messages that are sent to the NGSN 108 specify high-level functions needed by the call, such as a request for a port for a call offered to NGSN 108, or a call release to the bridging switch 104 with RLT.

In a preferred embodiment of the present invention, NGSN 108 and signaling gateway 110 use a PSP which includes twelve functional components. These twelve functional components are designed to correspond with typical functions provided by ANSI SS7, including RLT. However, these functions are fundamental to call processing and are common to many different signaling systems. The PSP may support functions of other signaling systems with little or no modification. Table 1 describes the twelve defined PSP functions of a preferred embodiment. Each PSP function either returns a "Return_Result", "Return_Error", or "Return$_{13}$ Reject" under appropriate circumstances.

TABLE 1

| PSP FUNCTION | DESCRIPTION |
| --- | --- |
| Activate_Port | The Activate_Port invoke operation notifies the application when a resource (or resource set) has been unblocked by the call network and is again available to support call processing. This component is used to provide resource management information. |
| Answer | The Answer invoke operation notifies the application when the called party has answered the call. This component is for outgoing calls. |
| Call_Offered | The Call_Offered component presents an inbound call to an application. Since this invoke operation is the beginning of the call, it is sent in a "begin dialog" message to initiate the dialog. This component carries, as parameters, a resource handle to the application port that the call came in on, and a number of parameters from a SS7 ISUP IAM message. |
| Connected | The Connected component notifies the call processing application that the voice path on an incoming call has been connected. |
| Logoff | The Logoff component identifies a resource that is no longer available. The component may contain a single, list, or range of resources. It also carries the reason for logging the resource/application off(i.e., Normal or Alarm). |
| Logon | The Logon function identifies a resource that has become available and may contain a list or range. |

TABLE 1-continued

| PSP FUNCTION | DESCRIPTION |
| --- | --- |
| Make_Call | This invoke operation initiates an outbound call. It carries many of the parameters to be used to build a SS7 IAM. The actual port used is selected by the signaling gateway 110, and a handle is returned as a result for the Make_Call operation. |
| Release | The Release function is sent to the signaling gateway 110 by the call processing application to initiate a release or RLT. A simple release is accomplished with a SS7 REL. RLT is accomplished with a SS7 Facility Request message (FAR). |
| Release_Notice | The Release_Notice function informs the call processing application of a network release. |
| Loop_Port | The Loop_Port component notifies the call processing platform to loop (bridge together) the send and receive lines on the specified resource. |
| UnLoop_Port | The UnLoop_Port component notifies the call processing platform to unloop (unbridge) the send and receive lines on the specified resource. |
| Deactivate_Port | The Deactivate_Port invoke operation notifies the application when a resource (or resource set) has been blocked by the call network and is no longer available to support call processing. This component is used to provide resource management information. |

Further details on call processing and the functions performed by the signaling gateway 110 are described in commonly-owned, co-pending applications filed concurrently herewith, entitled "System for Executing Advanced Interactive Voice Response Services Using Service-Independent Building Blocks" having application number 09/073,887; and "Call and Circuit State Machine for a Transaction Control Layer of a Communications Signaling Gateway" having application number 09/073,885 which are incorporated herein by reference in their entirety.

Signaling Gateway Internal Architecture

Figure 2:
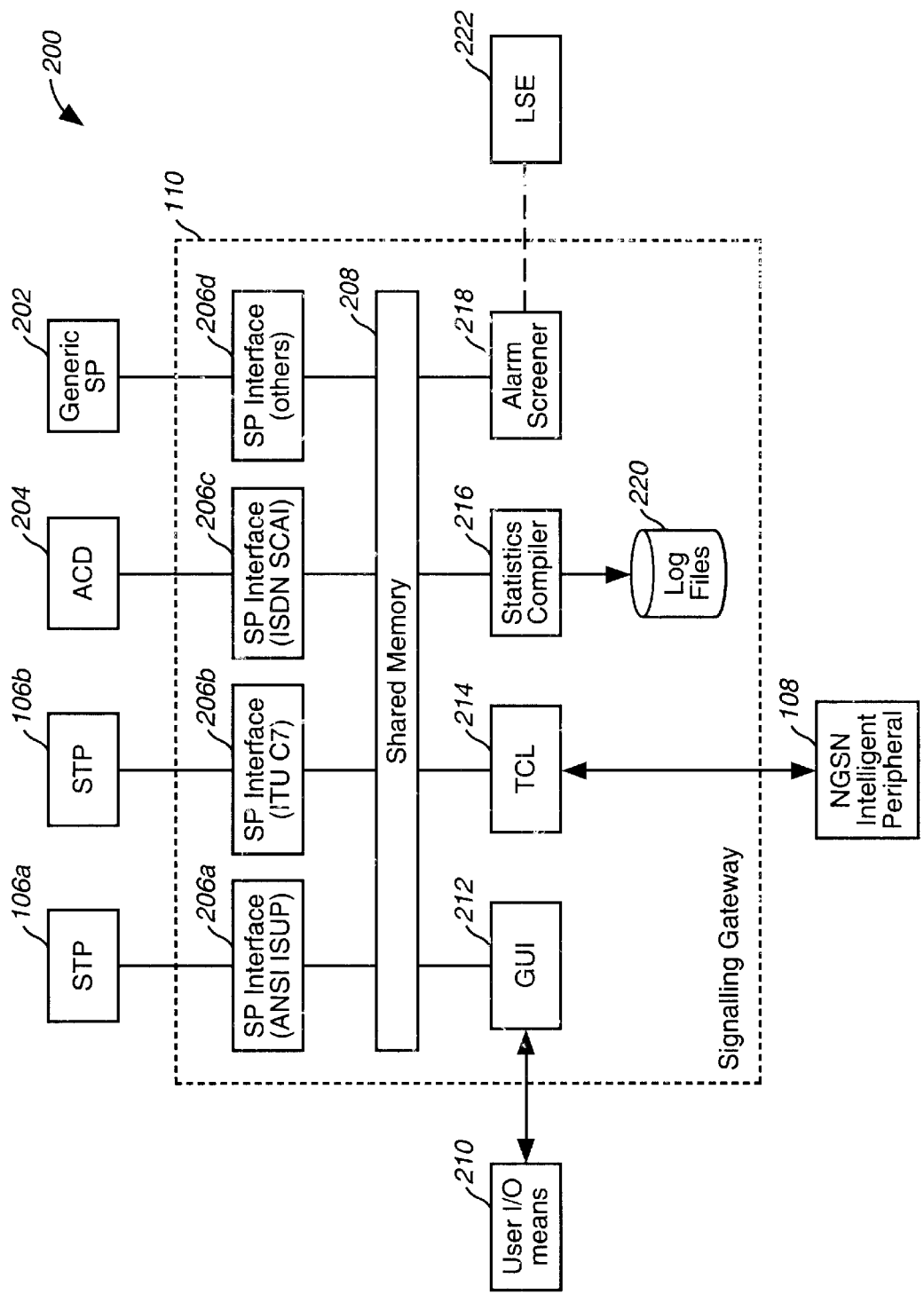
FIG. 2 illustrates the internal architecture of a communications signaling gateway according to the present invention.

FIG. 2 illustrates the internal architecture 200 of the signaling gateway 110. The signaling gateway 110 may be implemented on a single computer, but it is preferably implemented on a dual computer platform to provide redundancy in case of failure (as will be described with reference to FIG. 4). In a preferred embodiment, signaling gateway 110 is a high-performance mid-range computer, such as an IBM RS/6000 (available from International Business Machines of Armonk, N.Y.) running the UNIX/AIX operating system.

The signaling gateway 110 includes several processes that communicate via a shared memory 208. A plurality of signaling point (SP) interface processes 206 are communications drivers and message servers (shown as SP interfaces 206a–206d) that each provide an interface to a particular signaling system. In alternate embodiments of the signaling gateway 110, one or more types of SP interface processes 206 are included to interface to particular signaling systems.

A generic SP 202 refers to a network component, such as a digital matrix switch or service switch point, such as bridging switch 104, that generates signaling messages. Each of the SP interface 206 processes manage low level communications with the generic SP 202 or a signaling switching component, such as the STPs 106a or 106b. Each of the SP interface processes 206 also performs low-level message server functions. For example, SP interface 206a, for ANSI ISUP, manages communications with the STP 106a, to exchange SS7 messages with a digital matrix switch or service switch point. It extracts an ISUP or a transactional capabilities application part (TCAP) message from the application layers of SS7 messages, and passes the ISUP or TCAP message to a transaction control layer (TCL) 214.

The TCL 214 performs message translation and resource management. The TCL 214 includes a state machine process that tracks the states of both calls and resources on the NGSN 108 platform and the bridging switch 104. It receives messages from an SP interface 206, such as ISUP messages from an ANSI SS7 ISUP SP interface 206a. It triggers certain state changes in the current call and resources used for that call. It then generates an PSP message and sends it to the intelligent peripheral located on the NGSN 108. The TCL 214 also receives PSP messages from the intelligent peripheral located on the NGSN 108, triggers state changes in the current call and resources used for that call, generates a SS7 ISUP or other appropriate signaling system message, and sends that message to the appropriate SP interface 206.

In a preferred embodiment, the intelligent peripherals are computers on the NGSN 108 node with telephony ports that connect to the network bridging switch 104 via T1 voice trunks. Their general purpose is to receive calls from the network, provide voice response to the caller, and collect caller input via DTMF signals or voice recognition. In a preferred embodiment, the intelligent peripherals are built using DEC Alpha Voice 1000 computers. An NGSN 108 architecture (along with an intelligent peripheral) is described in detail in a commonly-owned, co-pending application filed concurrently herewith, entitled "Advanced Interactive Voice Response Service Node" having application number 09/073,880, which in incorporated herein by reference in its entirety.

The signaling gateway 110 also has a graphical user interface (GUI) 212 process that is connected to a user input/output (I/O) means 210. The I/O means 210 can be a keyboard and monitor connected directly to the signaling gateway 110 computer, or a personal computer workstation connected via a LAN to the signaling gateway 110 computer. The GUI 212 and user I/O means 210 allow users to issue queries to the TCL 214 for current call or resource states, configure certain parameters, reads statistics from log files, validate circuits, or block and unblock circuits manually.

An alarm screener 218 generates alarms based on messages received from the SP interface processes 206, NGSN 108, or the signaling gateway 110 operating system's (e.g., UNIX/AIX) messages. The alarm screener 218 sends these alarms to a Local Support Element (LSE) 222, via the management workstation located on NGSN 108 (not shown in FIG. 2). The LSE is a computer connected to the NGSN 108 via a WAN. The LSE collects alarms from many network elements, and provides a single point of interface for monitoring network alarms.

A statistics compiler 216 tracks statistics generated by the signaling gateway 110. These include number of calls received, inbound versus outbound calls processed, average call handling times, etc. The statistics compiler 216 records statistical data to a local log files database 220.

Signaling Gateway Logical Architecture

Figure 3:
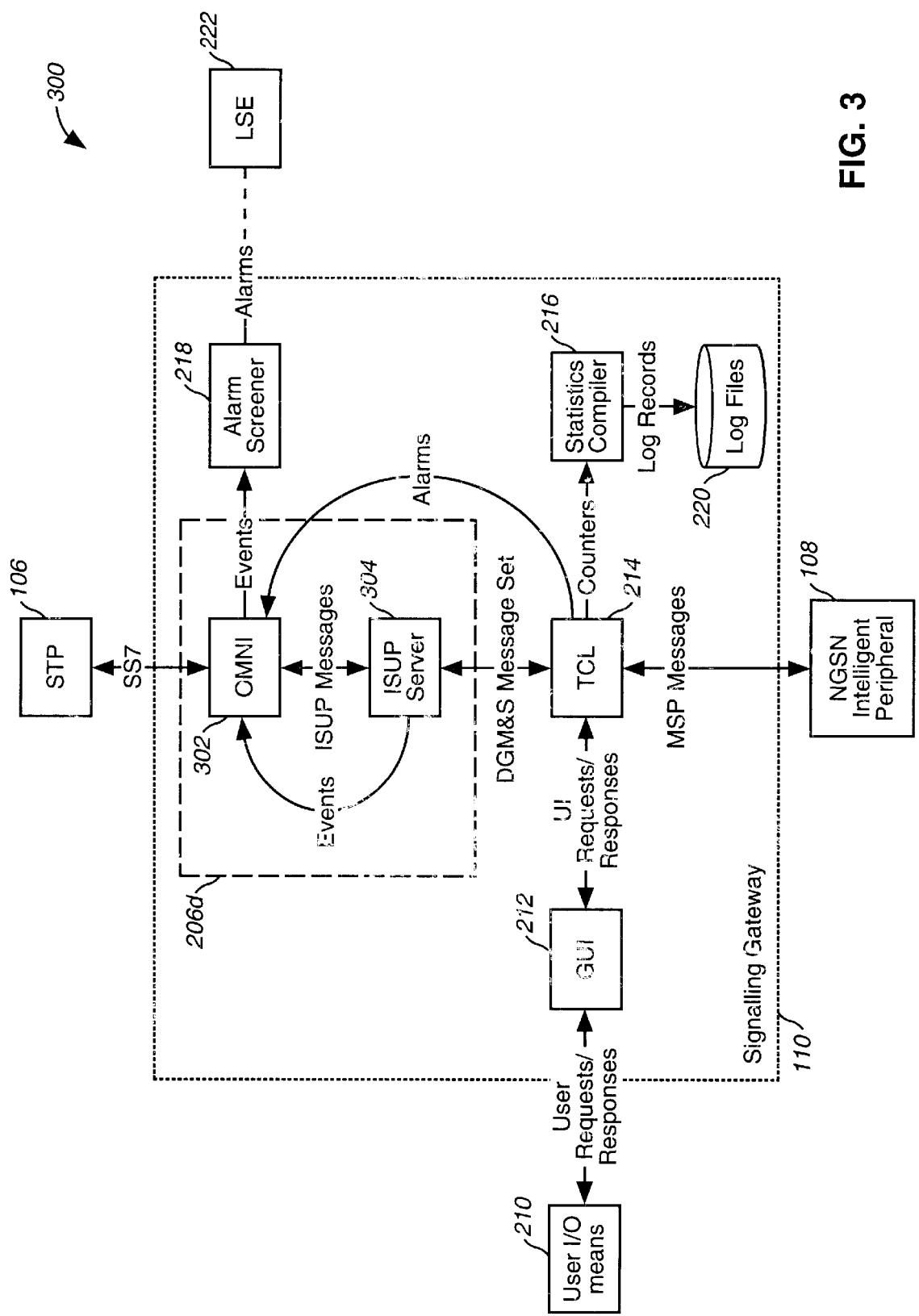
FIG. 3 illustrates the logical process architecture of the communications signaling gateway in a preferred embodiment.

FIG. 3 illustrates the logical process architecture 300 of the signaling gateway 110 according to a preferred embodiment. In this embodiment, the signaling gateway 110 is used to interface the NGSN 108 with an ANSI SS7 telecommunications network (i.e., PSTN 102 ). The NGSN 108 is connected via voice trunks to a bridging switch 104 that has RLT capabilities and is part of the PSTN 102. The bridging switch 104 exchanges signaling messages with NGSN 108 via the STP 106 and the signaling gateway 110.

The signaling gateway 110 receives SS7 messages from the bridging switch 104 via the STP 106, and extracts the ISUP layer message. It returns to the bridging switch 104 the same type of messages, to communicate NGSN 108 call processing. On the back end, the signaling gateway 110 exchanges PSP messages with the intelligent peripheral located on the NGSN 108. While it is correct to say that the signaling gateway 110 translates between ISUP and PSP messages, the signaling gateway 110 actually generates new ISUP and PSP messages that it sends to the bridging switch 104 and the NGSN 108, respectively. Generation of new ISUP and PSP messages is based on the signaling gateway 110 TCL 214 process performing call and resource state management, determining the next action needed by either the bridging switch 104 or the NGSN 108, and then sending the appropriate message to communicate that action.

In a preferred embodiment of signaling gateway 110, the SP interface process 206, more specifically, SP interface process 206a as shown in FIG. 2, is provided by an OMNI Soft Platform™ (available from DGM&S Telecom of Mt. Laurel, N.J.) which is a product suite that provides an ANSI SS7 interface 302. Interface 302 includes SS7 network cards and communications software for interfacing with SS7 networks. The OMNI Soft Platform™ product suite also provides an ISUP server 304 (shown separately in FIG. 3 for illustrative purposes). Interface 302 receives SS7 messages directly from the STP 106, and extracts the ISUP message layer. The ISUP server 304 formulates the ISUP message into a DGM&S proprietary message set, while still maintaining ISUP message parameters. The ISUP server 304 then passes the ISUP message to the TCL 214.

TCL 214 receives ISUP messages from the ISUP server 304. It uses these messages to trigger an appropriate state change in the current call, as well as any resources (i.e., ports) used for the call. It then determines the next action needed by either the bridging switch 104, NGSN 108, or both. It creates an ISUP message for communicating any actions needed to the bridging switch 104, and a PSP message for communicating any actions needed to NGSN 108. The TCL 214 sends PSP messages directly to the intelligent peripheral located on the NGSN 108 via the NGSN 108 LAN, using TCP/IP. The TCL 214 sends ISUP messages to the ISUP server 304. Interface 302 then creates the lower level (e.g., MTP1, MTP2, MTP3, etc.) SS7 message structures, and sends the SS7 message to the bridging switch 104 via the STP 106.

The TCL 214 state machine processes are described in further detail in commonly-owned, co-pending application filed concurrently herewith, entitled "Call and Circuit State Machine for a Transaction Control Layer of a Communications Signaling Gateway" having application number 09/073,885 which is incorporated herein by reference in its entirety.

Signaling Gateway Failover Process

Figure 4:
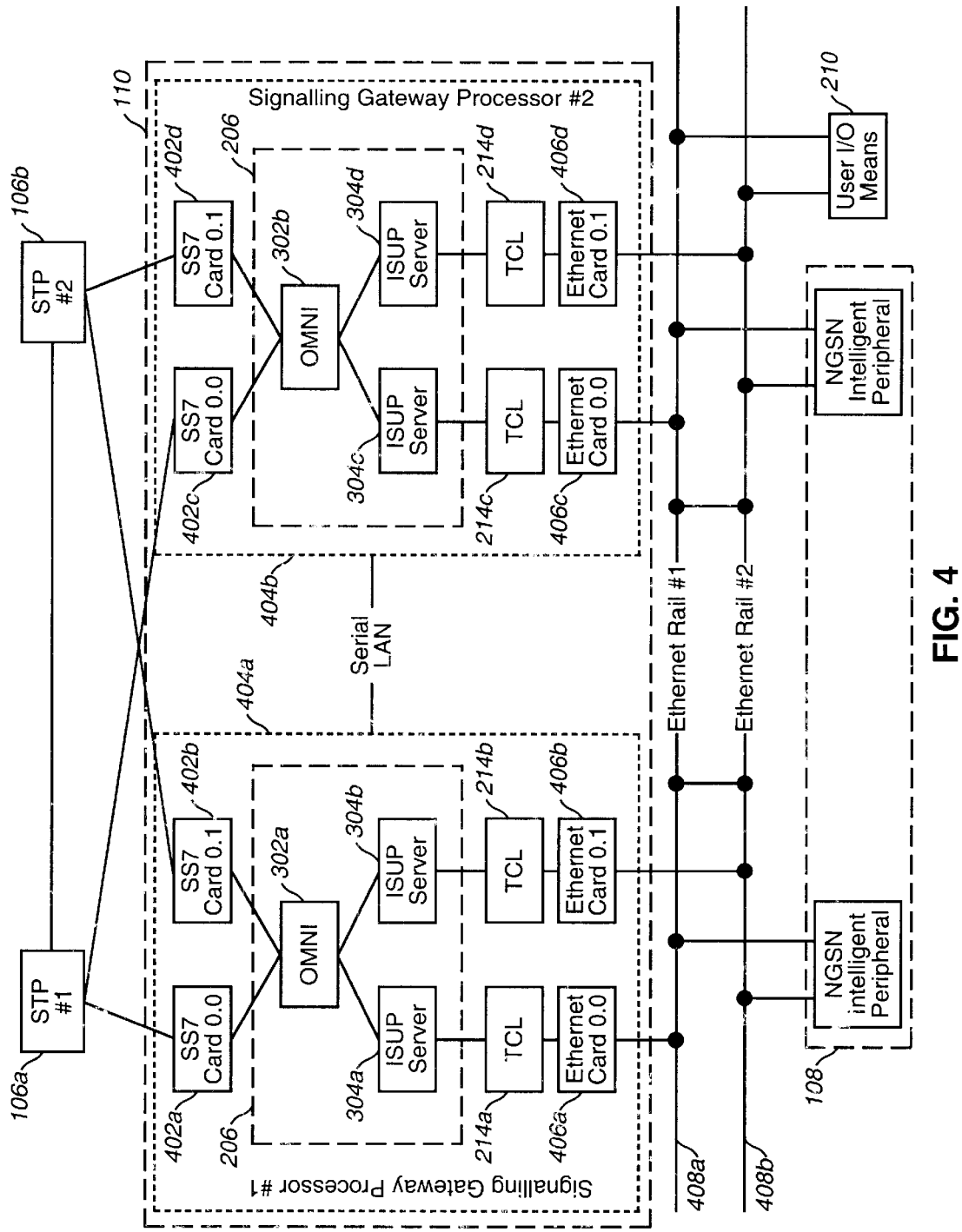
FIG. 4 illustrates the physical redundant architecture of the communications signaling gateway highlighting the features used for failover according to the present invention.

FIG. 4 illustrates the physical redundant architecture of the signaling gateway 110 highlighting the features used for failover according to a preferred embodiment. The signaling gateway 110 platform includes a pair of processors 404a and 440b. Each processor 404 is configured to handle 100% of the expected transaction volume, but runs nominally at 50%. In nominal operations, both processors 404 process live traffic, each handling 50% of the transaction volume.

Figure 5:
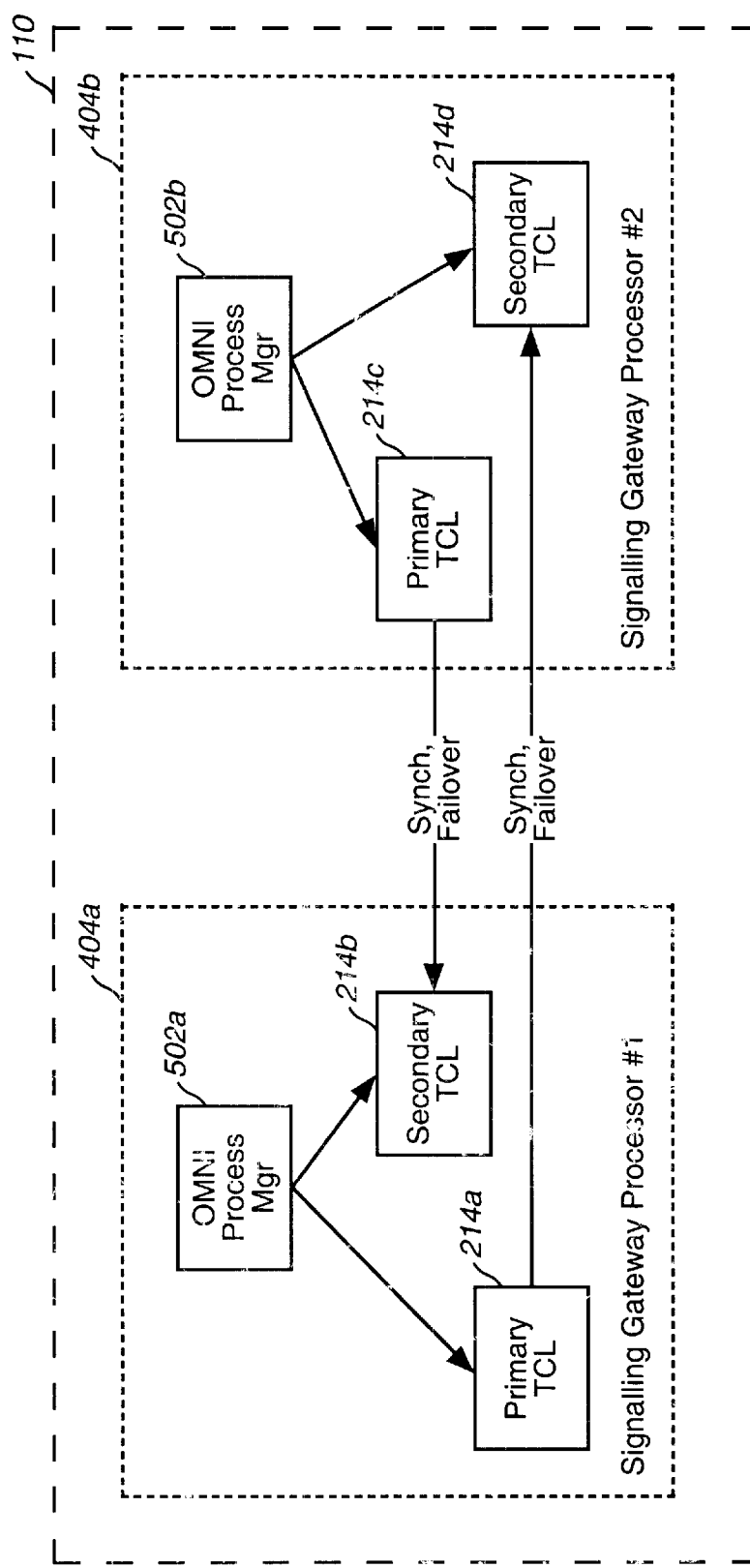
FIG. 5 is a logical representation of the failover process employed by the signaling gateway according to the present invention.

Each processor has two TCL 214 processes, one designated as primary (TCL 214a on processor 404a and TCL 214c in processor 404b) and one designated as secondary (TCL 214b on processor 404a and TCL 214d on processor 404b). The secondary TCL 214b and TCL 214d processes sit idle in nominal operations, and are used as backup to the primary TCL 214c and TCL 214a, respectively, on the other processor. This configuration is illustrated in FIG. 5. Each TCL 214 process is served by its own ISUP server 304 (shown as 304a–304d).

Each signaling gateway 110 processor may be connected to an intelligent peripheral on NGSN 108 via dual Ethernet rails 408a and 408b. Each TCL 214 on processors 404 is served by its own Ethernet card 406 connected to one of the Ethernet rails 408. This provides both physical redundancy in the LAN connections to NGSN 108, and logical redundancy for message exchange from each of the signaling gateway processors 404 to the NGSN 108.

Additionally, each of the signaling gateway processors 404 has dual connections to the switch network 102. Each of the processors 404 has a data link to each of the two STPs 106. The processors 404 themselves are connected to each other via a serial LAN. This is used for automatic failover, as illustrated in FIG. 5.

FIG. 5 is a logical representation of the failover process employed by the signaling gateway 110. Each of the signaling gateway processors, 404a and 404b, has a primary TCL process 214a and 214c and a secondary TCL process 214b and 214d respectively. The primary TCL 214a of processor 404a fails over to the secondary TCL 214d of the other processor 404b. The OMNI Soft Platform™ interface 302 (shown in FIG. 3) also provides a process manager 502 component. The process manager 502 monitors the other signaling gateway 110 processes, and restarts a process when one fails. If signaling gateway processor 404a should fail, the secondary TCL 214, of the other processor 404b automatically, via a trigger from the process manager 502a, takes over processing. This is done via a serial connection between process manager 502a and process manager 502b (not shown in FIG. 5). Since each processor 404 is configured to handle 100% of the transaction volume, the secondary TCL 214d, can handle the additional 50% placed on it by failure of the primary TCL 214a of the other processor 404a.

The TCL 214 is a state machine, tracking current states of calls in progress and resources of both the NGSN 108 and the bridging switch 104. Therefore, to enable automatic failover, the TCL 214 state machines of each processor 404 must continuously be kept synchronized. The serial LAN connection between the two processors (as shown in FIG. 4) is used to continuously transfer state data throughout processing.

Signaling Gateway User Interface

The GUI 212 on signaling gateway 110 enables users to validate circuits between the bridging switch 104 and the plurality of intelligent peripherals on NGSN 108, check current circuit states, and apply blocking and unblocking to circuits. Users may also configure signaling gateway 110 parameters through the GUI 212.

The TCL 214, in the course of processing ISUP and PSP messages representing call state transitions, passes counters to the statistics compiler 216. These counters indicate information such as number of inbound, outbound, and total calls processed; NGSN 108 call holding times; and other data as provided by TCL 214. The statistics compiler 216 compiles meaningful statistical data from these counters, and logs these data to the local log files database 220. The statistics compiler 216 may be configured to compile certain data, via the GUI 212.

The TCL 214 and ISUP server 304 generate events to record both nominal and exceptional processes conditions. Events are collected by the process manager 502, and forwarded to the alarm screener 218. The alarm screener 218 determines which events warrant user notification. It then generates alarms from these events, and sends the alarms to the LSE 222 via the management workstation located on the NGSN 108 (not shown in FIGS. 2 and 3).

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A system for facilitating call interaction with a communications network that includes a plurality of signaling points with a plurality of different associated signaling protocols, the system comprising:
    an interactive service node configured to interact with a caller via a voice channel; and
    a signaling gateway coupled between the plurality of signaling points and the interactive service node, the signaling gateway being configured to translate between any of the plurality of different signaling protocols and a single signaling protocol that is used by the interactive service node.

2. The system of claim 1, wherein the single signaling protocol is a proprietary signaling protocol.

3. The system of claim 1, wherein the plurality of different signaling protocols includes two or more of Signaling System 7 (SS7), C7, and Switch Computer Application Interface (SCAI).

4. The system of claim 1, wherein the interactive service node is further configured to prompt the caller for information.

5. The system of claim 1, wherein the interactive service node is further configured to retrieve telephone number information.

6. The system of claim 1, wherein the interactive service node is further configured to route the caller to an available call center.

7. A method, comprising:
    supplying signaling, that relates to a call from a caller, to a signaling gateway, the signaling using one of a plurality of different signaling protocols;
    translating the signaling between the one of the plurality of different signaling protocols and a single signaling protocol; and
    providing interactive services to the caller using a voice channel in response to the translated signaling.

8. The method of claim 7, wherein the single signaling protocol is a proprietary signaling protocol.

9. The method of claim 7, wherein the plurality of different signaling protocols includes two or more of Signaling System 7 (SS7), C7, and Switch Computer Application Interface (SCAI).

10. The method of claim 7, wherein the providing includes:
    prompting the caller for information.

11. The method of claim 7, wherein the providing includes:
    receiving and interpreting dialed digits from the caller.

12. The method of claim 7, wherein the providing includes:
    routing the caller to an available call center.

* * * * *